United States Patent
Pang et al.

(10) Patent No.: US 12,183,919 B2
(45) Date of Patent: Dec. 31, 2024

(54) SILICON-OXYGEN COMPOSITE NEGATIVE ELECTRODE MATERIAL AND METHOD FOR PREPARATION THEREOF AND LITHIUM-ION BATTERY

(71) Applicant: BTR NEW MATERIAL GROUP CO., LTD., Guangdong (CN)

(72) Inventors: Chunlei Pang, Guangdong (CN); Lijuan Qu, Guangdong (CN); Zhiqiang Deng, Guangdong (CN); Jianguo Ren, Guangdong (CN); Xueqin He, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 692 days.

(21) Appl. No.: 17/420,570

(22) PCT Filed: Oct. 28, 2020

(86) PCT No.: PCT/CN2020/124343
§ 371 (c)(1),
(2) Date: Jul. 2, 2021

(87) PCT Pub. No.: WO2021/083197
PCT Pub. Date: May 6, 2021

(65) Prior Publication Data
US 2022/0115652 A1    Apr. 14, 2022

(30) Foreign Application Priority Data
Oct. 30, 2019    (CN) .......................... 201911046596.8

(51) Int. Cl.
*H01M 4/48*    (2010.01)
*H01M 4/04*    (2006.01)
(Continued)

(52) U.S. Cl.
CPC .......... *H01M 4/48* (2013.01); *H01M 4/0471* (2013.01); *H01M 4/362* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2016/0118652 A1* | 4/2016 | Wu ....................... | H01M 4/364 429/213 |
| 2017/0117543 A1 | 4/2017 | Park et al. | |
| 2019/0044128 A1* | 2/2019 | Mckinney ............. | C01B 33/113 |

FOREIGN PATENT DOCUMENTS

| | | |
|---|---|---|
| CN | 105449183 A | 3/2016 |
| CN | 107851789 A | 3/2018 |
| CN | 107887587 A | 4/2018 |

OTHER PUBLICATIONS

International Search Report and Written Opinion issued in corresponding International Patent Application No. PCT/ CN2020/ 124343, mailed Jan. 28, 2021, 10 pages (with English Translation).

* cited by examiner

*Primary Examiner* — Carlos Barcena
(74) *Attorney, Agent, or Firm* — Merchant & Gould P.C.

(57) ABSTRACT

The present application provides a silicon-oxygen composite negative electrode material and method for preparation thereof and lithium-ion battery. The silicon-oxygen composite negative electrode material comprises a silicon-oxygen composite negative electrode material comprising $SiO_x$, non-$Li_2Si_2O_5$ lithium-containing compound, and $Li_2Si_2O_5$; said $Li_2Si_2O_5$ is coated on the surface of the non-$Li_2Si_2O_5$ lithium-containing compound; $0 \leq x \leq 1.2$. The preparation method comprises: mixing a first silicon source with a
(Continued)

Mixing a first silicon source $SiO_y$ with a reductive lithium source and roasting the mixture to obtain a composite material, the composite material including a non-$Li_2Si_2O_5$ lithium-containing compound, where $0 < y < 2$ — S100

Fusing the composite material with a second silicon source and then performing a heat treatment to obtain the silicon-oxygen composite negative electrode material, the silicon-oxygen composite negative electrode material including $SiO_x$, a non-$Li_2Si_2O_5$ lithium-containing compound, and $Li_2Si_2O_5$, the $Li_2Si_2O_5$ covering a surface of the non-$Li_2Si_2O_5$ lithium-containing compound, where $0 \leq x \leq 1.2$ — S200 reducing lithium source and roasting, to obtain a composite material containing a non-$Li_2Si_2O_5$ lithium-containing compound; the composite material containing the non-$Li_2Si_2O_5$ lithium-containing compound is fused with a second silicon source and then subjected to heat treatment to obtain a silicon-oxygen composite negative electrode material. The silicon-oxygen composite anode material provided by the present application is coated with $Li_2Si_2O_5$, solving the problem in the prior art of a negative electrode material producing strong alkaline or easily soluble by-products in water after pre-lithiation and affecting subsequent processing.

20 Claims, 1 Drawing Sheet

(51) Int. Cl.
*H01M 4/36* (2006.01)
*H01M 4/02* (2006.01)

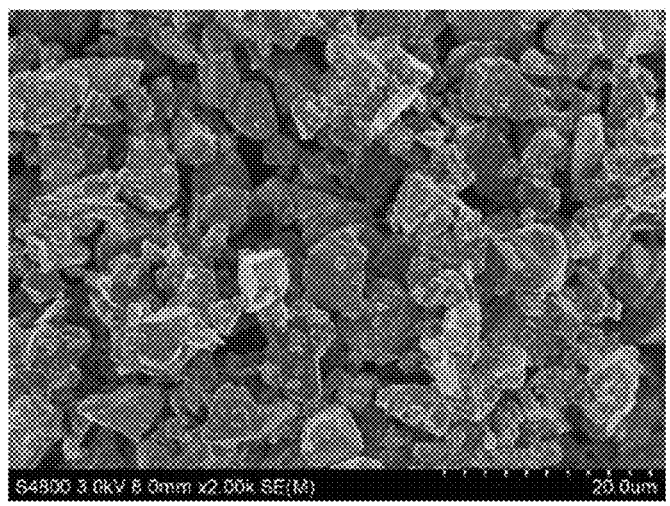
FIG. 1
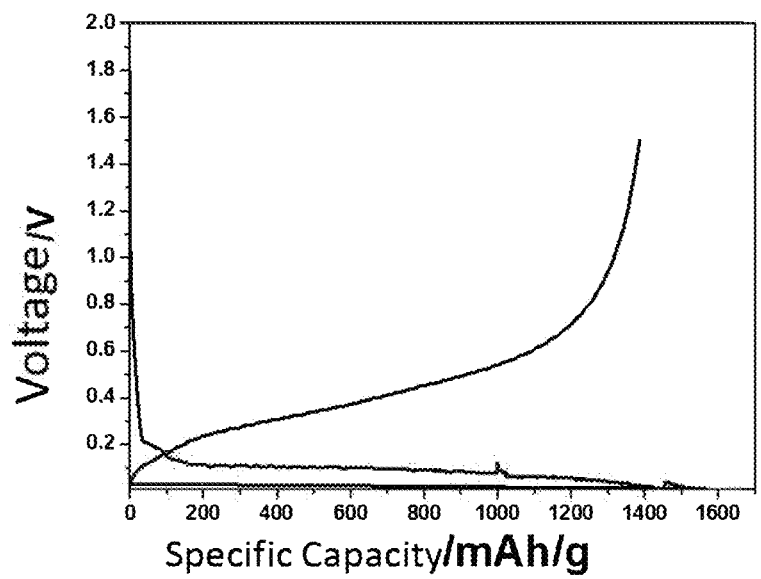
FIG. 2
FIG. 3

SILICON-OXYGEN COMPOSITE NEGATIVE ELECTRODE MATERIAL AND METHOD FOR PREPARATION THEREOF AND LITHIUM-ION BATTERY

This application is a National Stage Application of PCT/CN2020/124343, filed 28 Oct. 2020, which claims benefit of Ser. No. 20/1911046596.8, filed 30 Oct. 2019 in China and which applications are incorporated herein by reference. To the extent appropriate, a claim of priority is made to each of the above-disclosed applications.

TECHNICAL FIELD

The present disclosure pertains to the technical field of battery materials, and relates to a negative electrode material, a method of preparing the same, and a lithium-ion battery, and in particular to a silicon-oxygen composite negative electrode material, a method of preparing the same, and a lithium-ion battery.

BACKGROUND ART

Lithium-ion batteries have been widely used in portable electronic products and electric vehicles due to their advantages such as high working voltage, long cycle service life, no memory effect, low self-discharge, and environmental friendliness. Currently, commercial lithium-ion batteries are mainly made of graphite-like negative electrode materials, but their theoretical specific capacity is only 372 mAh/g, which cannot meet the future demand for high energy density in lithium-ion batteries. Although Si in the prior art has a high theoretical capacity of 4200 mAh/g, but it has a high expansion of 300%, which adversely affects the cycling performance and causes its popularization and use to be restricted in the market. The corresponding silicon-oxygen materials have better cycling performance, but have lower initial efficiency. During initial charging, 20% to 50% of lithium will be consumed for formation of a SEI film, which will greatly reduce the initial coulombic efficiency. As the positive electrode materials exhibit higher and higher initial efficiency, it is particularly important to improve the initial efficiency of the negative electrode materials.

Currently, the effective way to improve the initial efficiency of a negative electrode material is to dope the negative electrode material with lithium in advance so that an irreversible consumable lithium phase in the negative electrode material can be reacted earlier. In a method which has been industrialized, a lithium layer is applied directly to the surface of the electrode sheet, in order to achieve the effect of reducing the consumption of lithium in the positive electrode. However, this method has high requirements on the operating environment and may have a large safety hazard and therefore can hardly be popularized in industry. In the current state of technological development, the improvement of the initial efficiency by pre-lithiation at the material generally has the problem of poor processability, which is mainly manifested as: considerable gas production from a water-based slurry, low viscosity, tailing during application, and appearance of pinholes or air pores in the dried electrode sheet, and the like. This problem occurs mainly because a large amount of $Li_2SiO_3$ and $Li_4SiO_4$ phases, even $Li_2O$ and $Li_xSi$, are present in the materials after pre-lithiation, and these components are easily soluble in water to exhibit strong alkalinity, resulting in poor processability.

Therefore, poor processability is still a common problem of the pre-lithiated materials, and is also regarded as a technical difficulty.

A process method for pre-lithiation of a negative electrode sheet includes: (1) calculating the amount of lithium required to achieve the target degree of pre-lithiation; (2) preparing a dispersion of lithium powder in an electrolyte; (3) dripping the prepared suspension onto the electrode sheet so that the lithium powder is evenly spread on the electrode sheet along with the infiltration of the electrolyte, and pressing the resultant by a tablet press and leaving the resultant to rest, to obtain a pre-lithiated silicon electrode sheet. In this method, lithium powder is uniformly dispersed in the electrolyte and then added dropwise to the surface of the silicon electrode sheet, and the silicon electrode sheet is pre-lithiated by applying a certain pressure to the silicon electrode sheet.

Another pre-lithiation method for a lithium-ion battery includes the steps of: placing a bare cell in an electrolyte in the presence of an inert atmosphere and placing lithium metal strips in the electrolyte on both sides of the bare cell; taking two power sources, connecting the positive electrodes of the two power sources to the negative electrode of the bare cell, and connecting the negative electrodes of the two power sources to the two lithium metal strips respectively to charge the negative electrode of the bare cell, so that the negative electrode of the bare cell is pre-lithiated while being charged. After the charging is completed, the bare cell is taken out of the electrolyte, and a lithium-ion battery is fabricated from the bare cell according to procedures.

However, the above methods will cause the negative electrode materials to exhibit strong alkalinity, thereby adversely affecting water-based processability of the materials.

SUMMARY

In view of this, the present disclosure aims at providing a silicon-oxygen composite negative electrode material, a method of preparing the same, and a lithium-ion battery. The silicon-oxygen composite negative electrode material according to the present disclosure has advantages such as stable processability, high initial efficiency, and long cycle life.

In a first aspect, the present disclosure provides a silicon-oxygen composite negative electrode material. The silicon-oxygen composite negative electrode material comprises $SiO_x$, a non-$Li_2Si_2O_5$ lithium-containing compound, and $Li_2Si_2O_5$. The $Li_2Si_2O_5$ covers a surface of the non-$Li_2Si_2O_5$ lithium-containing compound, where $0 \leq x \leq 1.2$.

In this solution, as for the silicon-oxygen composite negative electrode material, by coating the surface of a non-$Li_2Si_2O_5$ lithium-containing compound with water-insoluble $Li_2Si_2O_5$, generation of strongly alkaline by-products due to contact of water with the internal non-$Li_2Si_2O_5$ lithium-containing compound is prevented effectively, so as to improve the processing stability of the pre-lithiated material. Moreover, even if the coated non-$Li_2Si_2O_5$ lithium-containing compound is easily soluble in water or exhibits strong alkalinity, it will not affect the water-based processability of the material and needs not to be removed additionally since it is coated by $Li_2Si_2O_5$. In this way, the maximum improvement of the initial efficiency of the material can be ensured.

In a feasible embodiment, the silicon-oxygen composite negative electrode material satisfies at least one of the following definitions a to g:

a. the non-$Li_2Si_2O_5$ lithium-containing compound comprises at least one of oxide of lithium, halide of lithium, hydroxide of lithium, lithium-containing alloy, carbonate of lithium, silicate of lithium, and acetate of lithium;
b. the content by mass percent of an oxygen element in the $SiO_x$ gradually decreases from the surface of the $SiO_x$ particles to the interior of the particles;
c. the $SiO_x$ is located inside the non-$Li_2Si_2O_5$ lithium-containing compound;
d. a mass ratio of the $SiO_x$ to the non-$Li_2Si_2O_5$ lithium-containing compound is 1:(1.5-4.3) (1:1.5 to 1:4.3);
e. the $Li_2Si_2O_5$ has a thickness of 100 nm to 5000 nm;
f. the silicon-oxygen composite negative electrode material has an average particle size of 4 μm to 10 μm; and
g. the silicon-oxygen composite negative electrode material has a pH value of 7<pH<11.

In a feasible embodiment, the silicon-oxygen composite negative electrode material satisfies at least one of the following definitions a to c:
a. a carbon layer is further formed on the surface of the silicon-oxygen composite negative electrode material;
b. a carbon layer is further formed on the surface of the silicon-oxygen composite negative electrode material, and the carbon layer has a thickness of 10 nm to 2000 nm; and
c. a carbon layer is further formed on the surface of the silicon-oxygen composite negative electrode material, and the carbon layer has a coating rate of 60% to 100%.

In a second aspect, the present disclosure provides a method for preparing a silicon-oxygen composite negative electrode material, comprising the steps of:

mixing a first silicon source $SiO_y$ with a reductive lithium source and roasting the mixture to obtain a composite material, the composite material comprising a non-$Li_2Si_2O_5$ lithium-containing compound, where 0<y<2; and fusing the composite material with a second silicon source and then performing a heat treatment to obtain the silicon-oxygen composite negative electrode material, the silicon-oxygen composite negative electrode material comprising $SiO_x$, a non-$Li_2Si_2O_5$ lithium-containing compound and $Li_2Si_2O_5$, the $Li_2Si_2O_5$ coating a surface of the non-$Li_2Si_2O_5$ lithium-containing compound, where 0≤x≤1.2.

In this solution, firstly, a first silicon source $SiO_y$ is mixed with a reductive lithium source to partially reduce the first silicon source to obtain a composite material containing a non-$Li_2Si_2O_5$ lithium-containing compound. Then, a second silicon source is reacted with the composite material containing the non-$Li_2Si_2O_5$ lithium-containing compound to adjust the ratio of silicon to oxygen at the surface, so as to obtain a structure in which the surface of the non-$Li_2Si_2O_5$ lithium-containing compound is coated by $Li_2Si_2O_5$, which can effectively prevent generation of strongly alkaline or water-soluble by-products due to contact of water with the internal non-$Li_2Si_2O_5$ lithium-containing compound so as to improve the processing stability of the pre-lithiated material. In this way, the initial efficiency of the negative electrode material is improved.

In a feasible embodiment, the silicon-oxygen composite negative electrode material satisfies at least one of the following definitions a to f:
a. the content by mass percent of an oxygen element in the $SiO_x$ gradually decreases from the surface of the $SiO_x$ particles to the interior of the particles;
b. the $SiO_x$ is located inside the non-$Li_2Si_2O_5$ lithium-containing compound;
c. a mass ratio of the $SiO_x$ to the non-$Li_2Si_2O_5$ lithium-containing compound is 1:(1.5-4.3) (1:1.5 to 1:4.3);
d. the $Li_2Si_2O_5$ has a thickness of 100 nm to 5000 nm;
e. the silicon-oxygen composite negative electrode material has an average particle size of 4 μm to 10 μm; and
f. the silicon-oxygen composite negative electrode material has a pH value of 7<pH<11.

In a feasible embodiment, the method satisfies at least one of the following definitions a to e:
a. the reductive lithium source comprises at least one of lithium hydride, lithium alkyl, lithium metal, lithium aluminum hydride, lithium amide, and lithium borohydride;
b. the first silicon source is SiO;
c. a mass ratio of the first silicon source to the reductive lithium source is 1:(0.03-0.4) (1:0.03 to 1:0.4);
d. the first silicon source has a particle size D10 greater than 1.0 μm and Dmax less than 50 μm; and
e. the non-$Li_2Si_2O_5$ lithium-containing compound comprises at least one of oxide of lithium, halide of lithium, hydroxide of lithium, lithium-containing alloy, carbonate of lithium, silicate of lithium, and acetate of lithium.

In a feasible embodiment, the method satisfies at least one of the following definitions a to c:
a. the roasting is performed in a non-oxidizing atmosphere, and the non-oxidizing atmosphere comprises at least one of hydrogen, nitrogen, helium, neon, argon, krypton, and xenon;
b. the roasting is performed at a temperature of 300° C. to 1000° C.; and
c. the roasting is performed for a duration of 1 h to 8 h.

In a feasible embodiment, the method further comprises:
cooling and sieving the composite material obtained by roasting so that the composite material has an average particle size of 2 μm to 9 μm.

In a feasible embodiment, the method satisfies at least one of the following definitions a to c:
a. the second silicon source comprises silicon dioxide;
b. the second silicon source comprises nanoscale silicon dioxide; and
c. a mass ratio of the composite material to the second silicon source is 1:(0.1-3) (1:0.1 to 1:3).

In a feasible embodiment, the method satisfies at least one of the following definitions a to c:
a. the heat treatment is performed at a temperature of 300° C. to 600° C.;
b. the heat treatment is performed at a heating rate less than 2° C./min; and
c. the heat treatment is performed for a duration of 0.5 h to 4 h.

In a feasible embodiment, the method further comprises, before mixing the first silicon source $SiO_y$ with the reductive lithium source,
heating and gasifying raw materials of oxide of silicon in a protective atmosphere or in vacuum to produce a gas of oxide of silicon, and cooling and shaping the resultant to obtain particles of the first silicon source $SiO_y$, where 0<y<2.

In a feasible embodiment, the method satisfies at least one of the following definitions a to d:
a. the raw materials of oxide of silicon comprise Si and $SiO_2$;
b. the heating is performed at a temperature of 900° C. to 1300° C.;
c. the shaping comprises at least one of crushing, ball milling, and classification; and
d. the particles of the first silicon source $SiO_y$ have a D10 greater than 1.0 μm and a Dmax less than 50 μm.

In a feasible embodiment, the method further comprises:

coating, using carbon, a material to be coated by carbon, the material to be coated by carbon comprising at least one of the first silicon source and the silicon-oxygen composite negative electrode material.

In a feasible embodiment, the method satisfies at least one of the following definitions a to c:

a. the coating with carbon comprises at least one of gas-phase carbon coating and solid-phase carbon coating;

b. the coating with carbon comprises at least one of gas-phase carbon coating and solid-phase carbon coating, and the gas-phase carbon coating is performed at a condition where the material to be coated by carbon is heated up to 600° C. to 1000° C. in the presence of a protective atmosphere, an organic carbon source gas is introduced, and the temperature is maintained for 0.5 h to 10 h and then the resultant is cooled, wherein the organic carbon source gas comprises a hydrocarbon, and the hydrocarbon comprises at least one of methane, ethylene, acetylene, and benzene; and c. the coating with carbon comprises at least one of gas-phase carbon coating and solid-phase carbon coating, and the solid-phase carbon coating is performed at a condition where the material to be coated by carbon is fused with a carbon source for 0.5 h to 2 h and then the obtained carbon mixture is carbonized at 600° C. to 1000° C. for 2 h to 6 h and cooled, wherein the carbon source comprises at least one of polymers, saccharides, organic acids and asphalt.

In a feasible embodiment, the method comprises the steps of:

mixing SiO with a reductive lithium source in a mass ratio of 1:(0.03-0.4), roasting the mixture in the presence of a non-oxidizing atmosphere at a roasting temperature of 450° C. to 800° C. for a roasting duration of 1 h to 8 h, and then cooling and sieving the resultant to obtain a composite material, the composite material comprising a non-$Li_2Si_2O_5$ lithium-containing compound; and fusing the composite material with $SiO_2$ in a mass ratio of 1:(0.1-3) and then performing a heat treatment at 300° C. to 600° C. for a heat treatment duration of 0.5 h to 4 h to obtain the silicon-oxygen composite negative electrode material, wherein the heat treatment is performed at a heating rate less than 2° C./min, wherein the preparation method further comprises coating, using carbon, at least one of the SiO and the silicon-oxygen composite negative electrode material, and the coating with carbon comprises at least one of gas-phase carbon coating and solid-phase carbon coating.

In a third aspect, the present disclosure discloses a lithium-ion battery. The lithium-ion battery comprises the silicon-oxygen composite negative electrode material according to the above first aspect or the silicon-oxygen composite negative electrode material prepared by the preparation method according to the above second aspect.

Compared with the prior art, the present disclosure has the following advantageous effects.

(1) In the silicon-oxygen composite negative electrode material according to the present disclosure, by coating the surface of a non-$Li_2Si_2O_5$ lithium-containing compound with dense and water-insoluble $Li_2Si_2O_5$ that does not negatively affect battery performance, generation of strongly alkaline by-products due to contact of water with the internal non-$Li_2Si_2O_5$ lithium-containing compound is prevented effectively, so as to improve the processing stability of the pre-lithiated material. Moreover, the coated non-$Li_2Si_2O_5$ lithium-containing compound will not affect the water-based processability of the material and needs not to be removed additionally even if it is easily soluble in water or exhibits strong alkalinity. In this way, the maximum improvement of the initial efficiency of the material can be ensured. The $Li_2Si_2O_5$ coating solves the problem of the negative electrode materials in the prior art which are pre-lithiated to produce strongly alkaline or water-soluble by-products that would influence subsequent processing. Thus, the processing stability of the material is improved.

(2) The preparation method according to the present disclosure involves a simple process, is environmentally friendly and free of pollution, and is therefore suitable for industrialized large-scale production.

BRIEF DESCRIPTION OF THE DRAWINGS

FIG. 1 is a process flowchart of a method for preparing a silicon-oxygen composite negative electrode material according to the present disclosure;

FIG. 2 is an SEM image of a silicon-oxygen composite negative electrode material according to Example 2 of the present disclosure; and FIG. 3 show initial charge and discharge curves of the silicon-oxygen composite negative electrode material according to Example 2 of the present disclosure.

DETAILED DESCRIPTION OF THE EMBODIMENTS

The present disclosure will be described in further detail below, in order to provide a better illustration of the present disclosure and facilitate the understanding of the technical solutions of the present disclosure. However, the following embodiments are merely simple examples of the present disclosure and are not intended to represent or limit the scope of protection of the present disclosure. The scope of protection of the present disclosure is defined by the claims.

Typical but non-limiting embodiments of the present disclosure are given below.

A certain amount of irreversible phases (e.g., $Li_4SiO_4$, $Li_2O$ and the like) will be produced during initial intercalation of lithium into most silicon-based/silicon-oxygen-based materials, resulting in low initial coulombic efficiency of batteries. The negative electrode material is doped with lithium element by a pre-lithiation treatment. In this way, during the battery formation process, lithium from the negative electrode material, instead of lithium ions deintercalated from the positive electrode, will be consumed by a SEI film formed at the negative electrode interface, thereby maximizing the retention of the lithium ions deintercalated from the positive electrode and increasing the capacity of the whole battery. Currently, a large amount of $Li_2SiO_3$ and $Li_4SiO_4$ phases and even $Li_2O$ and $Li_xSi$ are present in the pre-lithiated materials. These substances will consume the electrolyte and the Li deintercalated from the positive electrode, and this process is irreversible, resulting in a serious loss of the initial reversible capacity. Moreover, all these components are easily soluble in water and exhibit strong alkalinity, resulting in poor processability.

In a first aspect, an embodiment of the present disclosure provides a silicon-oxygen composite negative electrode material. The silicon-oxygen composite negative electrode material includes $SiO_x$, a non-$Li_2Si_2O_5$ lithium-containing compound and $Li_2Si_2O_5$. The $Li_2Si_2O_5$ covers a surface of the non-$Li_2Si_2O_5$ lithium-containing compound, where $0 \leq x \leq 1.2$.

In the present disclosure, as for the silicon-oxygen composite negative electrode material, by coating the surface of a non-$Li_2Si_2O_5$ lithium-containing compound with water-insoluble $Li_2Si_2O_5$, generation of strongly alkaline by-products due to contact of water with the internal non-$Li_2Si_2O_5$ lithium-containing compound is prevented effectively so as to improve the processing stability of the pre-lithiated material. Moreover, even if the coated non-$Li_2Si_2O_5$ lithium-containing compound is easily soluble in water or exhibits strong alkalinity, it will not affect the water-based processability of the material and needs not to be removed additionally since it is coated by $Li_2Si_2O_5$. In this way, the maximum improvement of the initial efficiency of the material can be ensured.

The silicon-oxygen composite negative electrode material according to the present disclosure comprises dense and water-insoluble $Li_2Si_2O_5$ that does not negatively affect battery performance, generated on the surface of a by-product produced after pre-lithiation. On the one hand, the problem of processing of the pre-lithiated negative electrode material can be ameliorated. On the other hand, the preparation process is simple, environmentally friendly, and free of pollution, and ingeniously solves the problem in the prior art in which strongly alkaline or water-soluble by-products that would influence subsequent processing are generated after pre-lithiation.

The following description is illustrative of preferred technical solutions of the present disclosure, but is not intended to limit the technical solutions according to the present disclosure. The technical objectives and advantageous effects of the present disclosure can be better achieved and realized by the following preferred technical solutions.

As an optional technical solution of the present disclosure, the non-$Li_2Si_2O_5$ lithium-containing compound includes at least one of oxide of lithium, halide of lithium, hydroxide of lithium, lithium-containing alloy, carbonate of lithium, silicate of lithium, and acetate of lithium.

As an optional technical solution of the present disclosure, "x" in the $SiO_x$ satisfies $0 \leq x \leq 1.2$. For example, $SiO_x$ may be Si, $SiO_{0.2}$, $SiO_{0.4}$, $SiO_{0.6}$, $SiO_{0.8}$, SiO, $SiO_{1.2}$, or the like. Preferably, $SiO_x$ is SiO.

As an optional technical solution of the present disclosure, the content by mass percent of an oxygen element in the $SiO_x$ gradually decreases from the surface of the $SiO_x$ particles to the interior of the particles. In other words, the content by mass percent of the oxygen element on the surface of each of the $SiO_x$ particles is higher than the content by mass percent of the oxygen element in the interior of the particle.

As an optional technical solution of the present disclosure, the $SiO_x$ is located inside the non-$Li_2Si_2O_5$ lithium-containing compound. Exemplarily, the non-$Li_2Si_2O_5$ lithium-containing compound may contain one or more $SiO_x$ particles, or the non-$Li_2Si_2O_5$ lithium-containing compound may be dispersed in the $SiO_x$ particles.

As an optional technical solution of the present disclosure, the $Li_2Si_2O_5$ has a thickness of 100 nm to 5000 nm, for example, 100 nm, 110 nm, 120 nm, 130 nm, 150 nm, 180 nm, 200 nm, 500 nm, 1000 nm, 2000 nm, 3000 nm, 4000 nm, or 5000 nm, but the thickness is not limited to the listed values, and other unlisted values within this numerical range are also applicable. Understandably, if the thickness of $Li_2Si_2O_5$ is too thin, $Li_2Si_2O_5$ cannot effectively prevent contact of water with the internal non-$Li_2Si_2O_5$ lithium-containing compound, which will lead to gas production during the processing of the negative electrode material. If the thickness of $Li_2Si_2O_5$ is too thick, the lithium ion transmission efficiency is reduced, and the overall performance of the negative electrode material is degraded.

As an optional technical solution of the present disclosure, in the silicon-oxygen composite negative electrode material, a mass ratio of the $SiO_x$ to the non-$Li_2Si_2O_5$ lithium-containing compound is 1:(1.5-4.3) (1:1.5 to 1:4.3) and may, more specifically, be 1:1.5, 1:1.8, 1:2.0, 1:2.2, 1:2.5, 1:2.8, 1:3.0, 1:3.5, 1:3.8, 1:4.0, or 1:4.3, but the mass ratio is not limited to the listed values, and other unlisted values within this numerical range are also applicable.

As an optional technical solution of the present disclosure, the silicon-oxygen composite negative electrode material has an average particle size of 4 μm to 10 μm, more specifically, 4 μm, 6 μm, 7 μm, 8 μm, 9 μm, or 10 μm. The cycling performance of the negative electrode material is advantageously improved by controlling the average particle size of the silicon-oxygen composite negative electrode material within the above range.

As an optional technical solution of the present disclosure, the silicon-oxygen composite negative electrode material has a pH value of 7<pH<11, more specifically, 7.1, 8.0, 9.3, 9.8, 10.5, 10.8, or 10.9. Understandably, the alkalinity of the material can be effectively reduced by coating the non-$Li_2Si_2O_5$ lithium-containing compound with $Li_2Si_2O_5$, thereby improving the water-based processability of the material and improving the initial efficiency of the negative electrode material.

As an optional technical solution of the present disclosure, the silicon-oxygen composite negative electrode material further includes a carbon layer, and the carbon layer is distributed on the surfaces of the particles of the silicon-oxygen composite negative electrode material.

The thickness of the carbon layer is 10 nm to 2000 nm and may, more specifically, be 10 nm, 50 nm, 100 nm, 300 nm, 500 nm, 800 nm, 1000 nm, 1500 nm, 1800 nm, or 2000 nm, but the thickness is not limited to the listed values, and other unlisted values within this numerical range are also applicable. If the carbon layer is too thick, the lithium ion transmission efficiency is reduced, the material is not advantageous in charging and discharging at a high rate, and the overall performance of the negative electrode material will be degraded. An excessively thin carbon layer does not contribute to an increase in the conductivity of the negative electrode material and has a weak capability of suppressing the volume expansion of the material, resulting in poor long-cycling performance.

The coating rate of the carbon layer is 60% to 100% and may, more specifically, be 60%, 70%, 80%, 90%, or 100%. In the present disclosure, the carbon layer is located on the outermost layer of the silicon-oxygen composite negative electrode material. The coating rate of the carbon layer refers to a rate at which the covered particles are coated with the carbon layer. Understandably, an increase in the coating rate of the carbon layer contributes to the suppression of the volume expansion of the negative electrode material and to the improvement of the cycling performance of the material.

In a second aspect, the present disclosure provides a method for preparing a silicon-oxygen composite negative electrode material. As shown in FIG. 1, the method includes the following steps:

S100 of mixing a first silicon source $SiO_y$ with a reductive lithium source and roasting the mixture to obtain a composite material, the composite material including a non-$Li_2Si_2O_5$ lithium-containing compound, where 0<y<2;

S200 of fusing the composite material with a second silicon source and then performing a heat treatment to obtain the silicon-oxygen composite negative electrode material, the silicon-oxygen composite negative electrode material including $SiO_x$, a non-$Li_2Si_2O_5$ lithium-containing compound, and $Li_2Si_2O_5$, the $Li_2Si_2O_5$ coating a surface of the non-$Li_2Si_2O_5$ lithium-containing compound, where $0 \leq x \leq 1.2$.

In the preparation method according to the present disclosure, firstly, a first silicon source $SiO_y$ is mixed with a reductive lithium source to partially reduce the first silicon source to obtain a composite material containing a non-$Li_2Si_2O_5$ lithium-containing compound. Then, a second silicon source is reacted with the composite material containing the non-$Li_2Si_2O_5$ lithium-containing compound to adjust the ratio of silicon to oxygen at the surface, to obtain a structure in which the surface of the non-$Li_2Si_2O_5$ lithium-containing compound is coated with $Li_2Si_2O_5$, which can effectively prevent generation of strongly alkaline by-products due to contact of water with the internal non-$Li_2Si_2O_5$ lithium-containing compound so as to improve the processing stability of the pre-lithiated material. In this way, the initial efficiency of the negative electrode material is improved.

The preparation method according to this solution will be described in detail below.

In S100, a first silicon source $SiO_y$ is mixed with a reductive lithium source and roasted to obtain a composite material containing a non-$Li_2Si_2O_5$ lithium-containing compound, where $0<y<2$.

As an optional technical solution of the present disclosure, the non-$Li_2Si_2O_5$ lithium-containing compound includes at least one of oxide of lithium, halide of lithium, hydroxide of lithium, lithium-containing alloy, carbonate of lithium, silicate of lithium, and acetate of lithium.

As an optional technical solution of the present disclosure, the first silicon source $SiO_y$ is used as a structure in which Si is uniformly distributed in $SiO_2$ with no obvious boundary therebetween. When the first silicon source $SiO_y$ is reduced with a reductive lithium source, the first silicon source is consumed, causing more Si to be present on the surface of the particles. Si has a tendency to agglomerate and tends to migrate to the interior of the particles of the first silicon source $SiO_y$ to agglomerate together with other Si, which may cause the content by mass percent of oxygen in the finally obtained product to gradually decrease from the surface of SiO to the interior of $SiO_x$. In other words, the content by mass percent of the oxygen element in the $SiO_x$ gradually decreases and the content by mass percent of the silicon element in the $SiO_x$ gradually increases, from the surface of the SiO particles to the interior of the particles.

As an optional technical solution of the present disclosure, the first silicon source $SiO_y$ satisfies $0<y<2$. More specifically, $SiO_y$ may, for example, be $SiO_{0.2}$, $SiO_{0.5}$, $SiO_{0.8}$, SiO, $SiO_{1.2}$, $SiO_{1.5}$, $SiO_{1.9}$, or the like. Preferably, the first silicon source is SiO.

As an optional technical solution of the present disclosure, the reductive lithium source includes at least one of lithium hydride, lithium alkyl, lithium metal, lithium aluminum hydride, lithium amide, and lithium borohydride.

Optionally, the mass ratio of the first silicon source $SiO_y$ to the reductive lithium source is 1:(0.03-0.4) (1:0.03 to 1:0.4) and may, more specifically, be 1:0.03, 1:0.05, 1:0.1, 1:0.15, 1:0.2, 1:0.25, 1:0.3, 1:0.35, or 1:0.4, but the mass ratio is not limited to the listed values, and other unlisted values within this numerical range are also applicable.

Optionally, the roasting is performed in a non-oxidizing atmosphere, and the non-oxidizing atmosphere includes at least one of hydrogen, nitrogen, helium, neon, argon, krypton, and xenon.

In some specific embodiments, the roasting may be carried out in a firing furnace so that the roasting is fully carried out.

Optionally, the roasting is performed at a temperature of 300° C. to 1000° C., more specifically, 300° C., 400° C., 500° C., 600° C., 700° C., 800° C., 900° C., or 1000° C., but the roasting temperature is not limited to the listed values, and other unlisted values within this numerical range are also applicable. Preferably, the roasting is performed at 450° C. to 800° C. Understandably, when the roasting is performed at an excessively high temperature, a violent reaction will occur, and the silicon crystal grains will grow up sharply, which will adversely affect the cycling performance of the material. When the roasting is performed at an excessively low temperature, an outer layer of $Li_2Si_2O_5$ cannot be generated subsequently.

Optionally, the roasting is performed for a duration of 1 h to 8 h, more specifically, 1 h, 2 h, 3 h, 4 h, 5 h, 6 h, 7 h, or 8 h, but the roasting duration is not limited to the listed values, and other unlisted values within this numerical range are also applicable. Understandably, sufficient roasting allows a sufficient amount of a non-$Li_2Si_2O_5$ lithium-containing compound to be formed on the surface of the material, so that the non-$Li_2Si_2O_5$ lithium-containing compound can be at least partially converted into $Li_2Si_2O_5$ by subsequent heat treatment, to adjust the ratio of silicon to oxygen at the surface, thereby obtaining a structure in which the surface of the non-$Li_2Si_2O_5$ lithium-containing compound is coated with $Li_2Si_2O_5$.

Further, after the step S100, the method further includes:
cooling and sieving the composite material obtained by roasting so that the composite material has an average particle size of 2 μm to 9 μm, more specifically, 2 μm, 3 μm, 4 μm, 5 μm, 6 μm, 7 μm, 8 μm, or 9 μm. In a specific embodiment, the sieving includes at least one of crushing, ball milling, screening or classification.

Further, before the step S100, the method further includes:
heating and gasifying raw materials of oxide of silicon in a protective atmosphere or in vacuum to produce a gas of oxide of silicon, and cooling and shaping the resultant to obtain particles of the first silicon source $SiO_y$, where $0<y<2$.

As an optional technical solution of the present disclosure, the raw materials of silicon oxide include Si and $SiO_2$. The specific ratio of Si to $SiO_2$ may be adjusted according to the required value of "y" in $SiO_y$, and is not limited here.

Optionally, the shaping includes at least one of crushing, ball milling, and classification.

The heating is performed at a temperature of 900° C. to 1300° C., more specifically, 900° C., 1000° C., 1100° C., 1200° C., or 1300° C., but the heating temperature is not limited to the listed values, and other unlisted values within this numerical range are also applicable.

As an optional technical solution of the present disclosure, the particles of the first silicon source $SiO_y$ have a D10 greater than 1.0 μm and a Dmax less than 50 μm. For example, D10 is 1.1 μm, 1.5 μm, 2.0 μm, 2.5 μm, 3.0 μm, 4.0 μm, or 5.0 μm, and Dmax is 49 μm, 45 μm, 30 μm, 35 μm, or 20 μm. It should be noted that Dmax refers to the particle size of the largest particle.

In S200, the composite material is fused with a second silicon source and then subjected to heat treatment to obtain the silicon-oxygen composite negative electrode material. The silicon-oxygen composite negative electrode material includes $SiO_x$, a non-$Li_2Si_2O_5$ lithium-containing compound and $Li_2Si_2O_5$, and the $Li_2Si_2O_5$ covers the surface of the non-$Li_2Si_2O_5$ lithium-containing compound, where $0 \leq x \leq 1.2$.

In the preparation method according to the present disclosure, the fusion operation is performed for the purpose of significantly increasing the uniformity of dispersion of the composite material and the second silicon source, which is conducive to the formation of dense and uniform $Li_2Si_2O_5$ after the subsequent heat treatment.

As an optional technical solution of the present disclosure, the second silicon source includes silicon dioxide.

Preferably, the second silicon source includes nanoscale silicon dioxide. Nanoscale silicon dioxide has a large specific surface area and contributes to a full reaction. More advantageously, when the surface of the composite material containing the non-$Li_2Si_2O_5$ lithium-containing compound is coated with a carbon layer, nanoscale silicon dioxide can penetrate through the carbon layer and react with the non-$Li_2Si_2O_5$ lithium-containing compound to form $Li_2Si_2O_5$.

As an optional technical solution of the present disclosure, the mass ratio of the composite material containing the non-$Li_2Si_2O_5$ lithium-containing compound to the second silicon source is 1:(0.1-3) (1:0.1 to 1:3), more specifically, 1:0.1, 1:0.5, 1:1, 1:2, or 1:3, but the mass ratio is not limited to the listed values, and other unlisted values within this numerical range are also applicable.

Optionally, the fusion is performed at room temperature.

Optionally, the heat treatment is performed at a temperature of 300° C. to 600° C., more specifically, 300° C., 400° C., 500° C., or 600° C., but the heat treatment temperature is not limited to the listed values, and other unlisted values within this numerical range are also applicable. Understandably, when the heat treatment is performed at an excessively high temperature, the structure of the internal non-$Li_2Si_2O_5$ lithium-containing compound will be changed. When the heat treatment is performed at an excessively low temperature, the non-$Li_2Si_2O_5$ lithium-containing compound will not be converted into $Li_2Si_2O_5$.

As an optional technical solution of the present disclosure, the heat treatment is performed at a heating rate less than 2° C./min, more specifically, of 1.9° C./min, 1.5° C./min, 1° C./min, 0.7° C./min, or 0.5° C./min. Understandably, if the heat treatment is performed at an excessively high heating rate, the generated $Li_2Si_2O_5$ will be distributed unevenly, which will adversely affect the processability of the material.

As an optional technical solution of the present disclosure, the heat treatment is performed for a duration of 0.5 h to 4 h, for example, 0.5 h, 1 h, 2 h, 3 h, or 4 h, but the heat treatment duration is not limited to the listed values, and other unlisted values within this numerical range are also applicable.

In the present disclosure, the above-mentioned heat treatment temperature and duration, and heating rate can be used such that these operating conditions coordinate with each other to facilitate the conversion of the non-$Li_2Si_2O_5$ lithium-containing compound into $Li_2Si_2O_5$, so as to better improve the performance of the product.

As a preferred technical solution of the present disclosure, the preparation method further includes:

coating, using carbon, a material to be coated by carbon, the material to be coated by carbon including at least one of the first silicon source and the silicon-oxygen composite negative electrode material.

Understandably, even if the first silicon source is coated with carbon, the carbon layer is still located on the outermost layer in the obtained silicon-oxygen composite negative electrode material, because the carbon layer is relatively loose and has a large number of micropores, and both the reductive lithium salt and the second silicon source in the subsequent steps can pass through the micropores of the carbon layer and penetrate through the carbon layer to react on the surface of the first silicon source.

The coating with carbon includes gas-phase carbon coating and/or solid-phase carbon coating.

As a preferred technical solution of the present disclosure, in case of the gas-phase carbon coating, the material to be coated by carbon is heated up to 600° C. to 1000° C. in the presence of a protective atmosphere, an organic carbon source gas is introduced, and the temperature is maintained for 0.5 h to 10 h and then the resultant is cooled.

In some embodiments, the organic carbon source gas includes a hydrocarbon, and the hydrocarbon includes at least one of methane, ethylene, acetylene and benzene.

As a preferred technical solution of the present disclosure, in case of the solid-phase carbon coating, the material to be coated by carbon is fused with a carbon source for 0.5 h to 2 h, and then the obtained carbon mixture is carbonized at 600° C. to 1000° C. for 2 h to 6 h and cooled.

In some embodiments, the carbon source includes at least one of polymers, saccharides, organic acids and asphalt.

As a further preferred technical solution of the preparation method described in the present disclosure, the method includes the steps of:

mixing SiO with a reductive lithium source in a mass ratio of 1:(0.03-0.4), roasting the mixture in the presence of a non-oxidizing atmosphere at a roasting temperature of 450° C. to 800° C. for a roasting duration of 1 h to 8 h, and then cooling and sieving the resultant to obtain a composite material containing a non-$Li_2Si_2O_5$ lithium-containing compound;

fusing the composite material containing a non-$Li_2Si_2O_5$ lithium-containing compound with $SiO_2$ in a mass ratio of 1:(0.1-3) and then performing a heat treatment at 300° C. to 600° C. for a heat treatment duration of 0.5 h to 4 h, to obtain the silicon-oxygen composite negative electrode material, wherein the heat treatment is performed at a heating rate less than 2° C./min, wherein the preparation method further includes coating, using carbon, at least one of the SiO and the silicon-oxygen composite negative electrode material, and the coating with carbon includes at least one of gas-phase carbon coating and solid-phase carbon coating.

In a third aspect, the present disclosure discloses a lithium-ion battery. The lithium-ion battery comprises the silicon-oxygen composite negative electrode material described in the above first aspect or the silicon-oxygen composite negative electrode material prepared by the preparation method described in the above second aspect.

The embodiments of the present disclosure will be further described by way of multiple examples below. Here, the embodiments of the present disclosure are not limited to the following specific examples. Appropriate changes can be implemented within the scope as claimed.

Example 1

In this example, a silicon-oxygen composite negative electrode material was prepared according to the following method.

(1) 1 kg of Si powder and 2 kg of $SiO_2$ powder were taken and put into a VC mixer and mixed for 30 min to obtain a mixture of $SiO_2$ and Si. The mixture was put into a vacuum furnace, and heated to 1300° C. under a negative pressure condition with a vacuum degree of 5 Pa and maintained at the temperature for 18 h, so that SiO vapor was generated in the furnace and rapidly condensed (at a condensation temperature of 950° C.) to form a SiO block. The SiO block was processed by crushing, ball milling, and classification processes to obtain a SiO powder material, with a median particle size controlled around 6 μm.

(2) 1 kg of the SiO powder material was taken and placed into a ball milling tank, to which 100 g of lithium hydride was added to perform ball-milling for 20 minutes. The resultant was taken out and placed in an atmosphere protection furnace, roasted in a nitrogen atmosphere at a roasting temperature of 800° C. for a roasting duration of 2 h, and naturally cooled down to room temperature. The materials were taken out and sieved and demagnetized to obtain a composite material.

(3) The composite material and nanoscale $SiO_2$ were placed in a mass ratio of 1:0.6 in a fusion machine and fused for 2.0 h with a rotational speed adjusted at 800 r/min and with a blade gap width of 0.5 cm, and then taken out and placed in a firing furnace for heat treatment at a heat treatment temperature of 350° C. at a heating rate of 0.5° C./min for a heat treatment duration of 40 min. Then, the resultant was cooled to room temperature to obtain a semi-finished product.

(4) 1.5 kg of the semi-finished product was taken and placed in a CVD rotary furnace, into which acetylene was introduced as a carbon source and nitrogen was introduced as a protective gas for deposition at 800° C. for 70 min, and the resultant was cooled and discharged to obtain a silicon-oxygen composite negative electrode material.

The silicon-oxygen composite negative electrode material prepared in this example includes $SiO_{0.8}$, $Li_2Si_2O_5$, and a non-$Li_2Si_2O_5$ lithium-containing compound, wherein the $Li_2Si_2O_5$ covers the surface of the non-$Li_2Si_2O_5$ lithium-containing compound. The non-$Li_2Si_2O_5$ lithium-containing compound consists of lithium silicate ($Li_2SiO_3$) and lithium hydroxide. $SiO_{0.8}$ is located inside the non-$Li_2Si_2O_5$ lithium-containing compound, and the content by mass percent of the oxygen element gradually decreases from the surface of the $SiO_{0.8}$ particles to the interior of $SiO_{0.8}$. The thickness of $Li_2Si_2O_5$ is 500 nm. The molar ratio of $SiO_{0.8}$ to the non-$Li_2Si_2O_5$ lithium-containing compound is 1:4.3. The silicon-oxygen composite negative electrode material has a median particle size of 5.4 μm, and the silicon-oxygen composite negative electrode material has a pH value of 10.8. The silicon-oxygen composite negative electrode material further includes a carbon layer distributed on the surfaces of the particles, and the coating rate of the carbon layer is 80%.

Table 1 shows the results of performance testing of the silicon-oxygen composite negative electrode material prepared in this example.

Example 2

In this example, a silicon-oxygen composite negative electrode material was prepared according to the following method.

(1) 1 kg of Si powder and 0.6 kg of $SiO_2$ powder were taken and put into a VC mixer and mixed for 30 min to obtain a mixture of $SiO_2$ and Si. The mixture was put into a vacuum furnace, and heated to 1300° C. under a negative pressure condition with a vacuum degree of 5 Pa and maintained at the temperature for 18 h, so that SiO vapor was generated in the furnace and rapidly condensed (at a condensation temperature of 950° C.) to form a $SiO_{0.5}$ block. The $SiO_{0.5}$ block was processed by crushing, ball milling, and classification processes to obtain a $SiO_{0.5}$ powder material, with a median particle size controlled around 6 μm.

(2) 1.5 kg of the $SiO_{0.5}$ powder material was taken and placed in a CVD rotary furnace, into which acetylene was introduced as a carbon source and nitrogen was introduced as a protective gas for deposition at 800° C. for 70 min, and the resultant was cooled and discharged to obtain a carbon-coated $SiO_{0.5}$ material.

(3) 1 kg of the carbon-coated $SiO_{0.5}$ material was taken and placed into a ball milling tank, to which 100 g of lithium hydride was added to perform ball-milling for 20 min. The resultant was taken out and placed in an atmosphere protection furnace, roasted in an argon atmosphere at a roasting temperature of 800° C. for a roasting duration of 2 h, and naturally cooled down to room temperature. The materials were taken out and sieved and demagnetized to obtain a composite material.

(4) The composite material and nanoscale $SiO_2$ were placed in a mass ratio of 1:0.6 in a fusion machine and fused for 2.0 h with a rotational speed adjusted at 800 r/min and with a blade gap width of 0.5 cm, and then taken out and placed in a firing furnace for heat treatment at a heat treatment temperature of 350° C. at a heating rate of 1.0° C./min for a heat treatment duration of 40 min. Then, the resultant was cooled to room temperature to obtain a silicon-oxygen composite negative electrode material.

The silicon-oxygen composite negative electrode material prepared in this example includes $SiO_{0.1}$, $Li_2Si_2O_5$, and a non-$Li_2Si_2O_5$ lithium-containing compound, wherein the $Li_2Si_2O_5$ covers the surface of the non-$Li_2Si_2O_5$ lithium-containing compound. The non-$Li_2Si_2O_5$ lithium-containing compound consists of lithium silicate ($Li_2SiO_3$) and lithium hydroxide. The $SiO_{0.1}$ is located inside the non-$Li_2Si_2O_5$ lithium-containing compound, and the content by mass percent of the oxygen element gradually decreases from the surface of $SiO_{0.1}$ to the interior of $SiO_{0.1}$. The thickness of $Li_2Si_2O_5$ is 600 nm. The molar ratio of $SiO_{0.1}$ to the non-$Li_2Si_2O_5$ lithium-containing compound is 1:4. The silicon-oxygen composite negative electrode material has a median particle size of 6.0 μm, and the silicon-oxygen composite negative electrode material has a pH value of 10.5. The silicon-oxygen composite negative electrode material further includes a carbon layer distributed on the surfaces of the particles, and the coating rate of the carbon layer is 80%.

Table 1 shows the results of performance testing of the silicon-oxygen composite negative electrode material prepared in this example.

FIG. 2 is an SEM image of the silicon-oxygen composite negative electrode material according to this example. It can be seen from this figure that the surface of the obtained material is coated densely.

FIG. 3 shows initial charge and discharge curves of the silicon-oxygen composite negative electrode material according to this example. It can be seen from this figure that the silicon-oxygen composite negative electrode material prepared in this example has high initial charge/discharge efficiency and has excellent cycling performance.

Example 3

In this example, a silicon-oxygen composite negative electrode material was prepared according to the following method.

(1) 1 kg of Si powder and 2.0 kg of $SiO_2$ powder were taken and put into a VC mixer and mixed for 30 min to obtain a mixture of $SiO_2$ and Si. The mixture was put into a vacuum furnace, and heated to 1100° C. under a negative pressure condition with a vacuum degree of 5 Pa and maintained at the temperature for 20 h, so that SiO$_y$ vapor was generated in the furnace and rapidly condensed (at a condensation temperature of 950° C.) to form a SiO block. The SiO block was processed by crushing, ball milling, and classification processes to obtain a SiO powder material, with a median particle size controlled around 6 μm.

(2) 1.5 kg of the SiO powder material was taken and placed in a CVD rotary furnace, into which methane was introduced as a carbon source and nitrogen was introduced as a protective gas for deposition at 600° C. for 10 h, and the resultant was cooled and discharged to obtain a carbon-coated SiO material.

(3) 1 kg of the carbon-coated SiO material was taken and placed into a ball milling tank, to which 120 g of lithium amide was added to perform ball-milling for 20 min. The resultant was taken out and placed in an atmosphere protection furnace, roasted in a nitrogen atmosphere at a roasting temperature of 850° C. for a roasting duration of 8 h, and naturally cooled down to room temperature. The materials were taken out and sieved and demagnetized to obtain a composite material.

(4) The composite material and nanoscale SiO$_2$ were placed in a mass ratio of 1:1 in a fusion machine and fused for 2.0 h with a rotational speed adjusted at 800 r/min and with a blade gap width of 0.5 cm, and then taken out and placed in a firing furnace for heat treatment at a heat treatment temperature of 300° C. at a heating rate of 1.0° C./min for a heat treatment duration of 2 h. Then, the resultant was cooled to room temperature to obtain a silicon-oxygen composite negative electrode material.

The silicon-oxygen composite negative electrode material prepared in this example includes SiO$_{0.5}$, Li$_2$Si$_2$O$_5$, and a non-Li$_2$Si$_2$O$_5$ lithium-containing compound, wherein the Li$_2$Si$_2$O$_5$ covers the surface of the non-Li$_2$Si$_2$O$_5$ lithium-containing compound. The non-Li$_2$Si$_2$O$_5$ lithium-containing compound consists of lithium oxide, lithium silicate (Li$_2$SiO$_3$), and lithium nitrate. The SiO$_{0.5}$ is located inside the non-Li$_2$Si$_2$O$_5$ lithium-containing compound, and the content by mass percent of the oxygen element gradually decreases from the surface of SiO$_{0.5}$ to the interior of SiO$_{0.5}$. The thickness of Li$_2$Si$_2$O$_5$ is 2000 nm. The molar ratio of SiO$_{0.5}$ to the non-Li$_2$Si$_2$O$_5$ lithium-containing compound is 1:3. The silicon-oxygen composite negative electrode material has a median particle size of 7 μm, and the silicon-oxygen composite negative electrode material has a pH value of 10.3. The silicon-oxygen composite negative electrode material further includes a carbon layer distributed on the surfaces of the particles, and the coating rate of the carbon layer is 100%.

Table 1 shows the results of performance testing of the silicon-oxygen composite negative electrode material prepared in this example.

Example 4

In this example, a silicon-oxygen composite negative electrode material was prepared according to the following method.

(1) 1 kg of Si powder and 3.0 kg of SiO$_2$ powder were taken and put into a VC mixer and mixed for 30 min to obtain a mixture of SiO$_2$ and Si. The mixture was put into a vacuum furnace, and heated to 900° C. under a negative pressure condition with a vacuum degree of 5 Pa and maintained at the temperature for 25 h, so that SiO$_y$ vapor was generated in the furnace and rapidly condensed (at a condensation temperature of 950° C.) to form a SiO$_{1.5}$ block. The SiO$_{1.5}$ block was processed by crushing, ball milling, and classification processes to obtain a SiO$_{1.5}$ powder material, with a median particle size controlled around 6 μm.

(2) 1.5 kg of the SiO$_{1.5}$ powder material was taken and placed in a CVD rotary furnace, into which ethylene was introduced as a carbon source and nitrogen was introduced as a protective gas for deposition at 1000° C. for 0.5 h, and the resultant was cooled and discharged to obtain a carbon-coated SiO$_{1.5}$ material.

(3) 1 kg of the carbon-coated SiO$_{1.5}$ material was taken and placed into a ball milling tank, to which 200 g of lithium borohydride was added to perform ball-milling for 20 min. The resultant was taken out and placed in an atmosphere protection furnace, roasted in a nitrogen atmosphere at a roasting temperature of 450° C. for a roasting duration of 6 h, and naturally cooled down to room temperature. The materials were taken out and sieved and demagnetized to obtain a composite material.

(4) The composite material and nanoscale SiO$_2$ were placed in a mass ratio of 1:0.1 in a fusion machine and fused for 2.0 h with a rotational speed adjusted at 750 r/min and with a blade gap width of 0.5 cm, and then taken out and placed in a firing furnace for heat treatment at a heat treatment temperature of 600° C. at a heating rate of 1.5° C./min for a heat treatment duration of 0.5 h. Then, the resultant was cooled to room temperature to obtain a silicon-oxygen composite negative electrode material.

The silicon-oxygen composite negative electrode material prepared in this example includes SiO, Li$_2$Si$_2$O$_5$, and a non-Li$_2$Si$_2$O$_5$ lithium-containing compound, wherein the Li$_2$Si$_2$O$_5$ covers the surface of the non-Li$_2$Si$_2$O$_5$ lithium-containing compound. The non-Li$_2$Si$_2$O$_5$ lithium-containing compound consists of lithium silicate (Li$_2$SiO$_3$) and lithium borate. In the SiO, x=1.0. SiO is located inside the non-Li$_2$Si$_2$O$_5$ lithium-containing compound, and the content by mass percent of the oxygen element gradually decreases from the surface of SiO to the interior of SiO. The thickness of Li$_2$Si$_2$O$_5$ is 800 nm. The molar ratio of SiO to the non-Li$_2$Si$_2$O$_5$ lithium-containing compound is 1:4.1. The silicon-oxygen composite negative electrode material has a median particle size of 8 μm, and the silicon-oxygen composite negative electrode material has a pH value of 10.1. The silicon-oxygen composite negative electrode material further includes a carbon layer distributed on the surfaces of the particles, and the coating rate of the carbon layer is 60%.

Table 1 shows the results of performance testing of the silicon-oxygen composite negative electrode material prepared in this example.

Example 5

In this example, a silicon-oxygen composite negative electrode material was prepared according to the following method.

(1) 1 kg of Si powder and 4 kg of SiO$_2$ powder were taken and put into a VC mixer and mixed for 30 min to obtain a mixture of SiO$_2$ and Si. The mixture was put into a vacuum furnace, and heated to 1200° C. under a negative pressure condition with a vacuum degree of 5 Pa and maintained at the temperature for 16 h, so that SiO vapor was generated in the furnace and rapidly condensed (at a condensation temperature of 950° C.) to form a SiO$_{1.8}$ block. The SiO$_{1.8}$ block was processed by crushing, ball milling, and classification processes to obtain a SiO$_{1.8}$ powder material, with a median particle size controlled around 6 μm.

(2) 1 kg of SiO$_{1.8}$ was taken and placed into a ball milling tank, to which 300 g of lithium aluminum hydride was added to perform ball-milling for 20 min. The resultant was taken out and placed in an atmosphere protection furnace, roasted in a nitrogen atmosphere at a roasting temperature of 300° C. for a roasting duration of 1 h, and naturally cooled down to room temperature. The materials were taken out and sieved and demagnetized to obtain a composite material.

(3) The composite material and nanoscale $SiO_2$ were placed in a mass ratio of 1:2 in a fusion machine and fused for 3.0 h with a rotational speed adjusted at 1000 r/min and with a blade gap width of 0.5 cm, and then taken out and placed in a firing furnace for heat treatment at a heat treatment temperature of 400° C. at a heating rate of 1.5° C./min for a heat treatment duration of 3 h. Then, the resultant was cooled to room temperature to obtain a semi-finished product.

(4) 1.5 kg of the semi-finished product and asphalt were taken and placed in the fusion machine and fused for a fusion duration of 1 h with a rotational speed of the fusion machine set at 2800 r/min to obtain a carbon source-containing mixture. Then, the carbon-containing mixture was placed and carbonized in a carbonization furnace at a carbonization temperature of 1000° C. for a carbonization duration of 2 h, and then the resultant was cooled and discharged to obtain a silicon-oxygen composite negative electrode material.

The silicon-oxygen composite negative electrode material prepared in this example includes $SiO_{1.7}$, $Li_2Si_2O_5$, and a non-$Li_2Si_2O_5$ lithium-containing compound, wherein the $Li_2Si_2O_5$ covers the surface of the non-$Li_2Si_2O_5$ lithium-containing compound. The non-$Li_2Si_2O_5$ lithium-containing compound consists of a lithium-silicon alloy, lithium oxide, and lithium metaaluminate. The $SiO_{1.7}$ is located inside the non-$Li_2Si_2O_5$ lithium-containing compound, and the content by mass percent of the oxygen element gradually decreases from the surface of $SiO_{1.7}$ to the interior of $SiO_{1.7}$. The thickness of $Li_2Si_2O_5$ is 3000 nm. The molar ratio of $SiO_{1.7}$ to the non-$Li_2Si_2O_5$ lithium-containing compound is 1:2.5. The silicon-oxygen composite negative electrode material has a median particle size of 5.0 μm, and the silicon-oxygen composite negative electrode material has a pH value of 10.4. The silicon-oxygen composite negative electrode material further includes a carbon layer distributed on the surfaces of the particles, and the coating rate of the carbon layer is 70%.

Table 1 shows the results of performance testing of the silicon-oxygen composite negative electrode material prepared in this example.

Example 6

In this example, a silicon-oxygen composite negative electrode material was prepared according to the following method.

(1) 1 kg of Si powder and 1.5 kg of $SiO_2$ powder were taken and put into a VC mixer and mixed for 30 min to obtain a mixture of $SiO_2$ and Si. The mixture was put into a vacuum furnace, and heated to 950° C. under a negative pressure condition with a vacuum degree of 10 Pa and maintained at the temperature for 16 h, so that SiO vapor was generated in the furnace and rapidly condensed (at a condensation temperature of 950° C.) to form a $SiO_{1.2}$ block. The $SiO_{1.2}$ block was processed by crushing, ball milling, and classification processes to obtain a $SiO_{1.2}$ powder material, with a median particle size controlled around 5 μm.

(2) 1 kg of $SiO_{1.2}$ was taken and placed into a ball milling tank, to which 400 g of lithium metal was added to perform ball-milling for 20 min. The resultant was taken out and placed in an atmosphere protection furnace, roasted in a nitrogen atmosphere at a roasting temperature of 1000° C. for a roasting duration of 4 h, and naturally cooled down to room temperature. The materials were taken out and sieved and demagnetized to obtain a composite material.

(3) The composite material and nanoscale $SiO_2$ were placed in a mass ratio of 1:3 in a fusion machine and fused for 1.5 h with a rotational speed adjusted at 2000 r/min and with a blade gap width of 0.5 cm, and then taken out and placed in a firing furnace for heat treatment at a heat treatment temperature of 500° C. at a heating rate of 0.5° C./min for a heat treatment duration of 60 min. Then, the resultant was cooled to room temperature to obtain a semi-finished product.

(4) 1.5 kg of the semi-finished product and asphalt were taken and placed in the fusion machine and fused for a fusion duration of 1 h with a rotational speed of the fusion machine set at 500 r/min to obtain a carbon source-containing mixture. Then, the carbon-containing mixture was placed and carbonized in a carbonization furnace at a carbonization temperature of 600° C. for a carbonization source of 6 h, and then the material was cooled and discharged to obtain a silicon-oxygen composite negative electrode material.

The silicon-oxygen composite negative electrode material prepared in this example includes $SiO_{0.5}$, $Li_2Si_2O_5$, and a non-$Li_2Si_2O_5$ lithium-containing compound, wherein the $Li_2Si_2O_5$ covers the surface of the non-$Li_2Si_2O_5$ lithium-containing compound. The non-$Li_2Si_2O_5$ lithium-containing compound consists of a lithium-silicon alloy and lithium oxide. The $SiO_{0.5}$ is located inside the non-$Li_2Si_2O_5$ lithium-containing compound, and the content by mass percent of the oxygen element gradually decreases from the surface of $SiO_{0.5}$ to the interior of $SiO_{0.5}$. The thickness of $Li_2Si_2O_5$ is 4000 nm. The molar ratio of $SiO_{0.5}$ to the non-$Li_2Si_2O_5$ lithium-containing compound is 1:1.5. The silicon-oxygen composite negative electrode material has a median particle size of 5.3 μm, and the silicon-oxygen composite negative electrode material has a pH value of 10.6. The silicon-oxygen composite negative electrode material further includes a carbon layer distributed on the surfaces of the particles, and the coating rate of the carbon layer is 90%.

Table 1 shows the results of performance testing of the silicon-oxygen composite negative electrode material prepared in this example.

Example 7

In this example, the operating conditions and the types and amounts of raw materials were the same as those in Example 2, except that the roasting in step (3) was performed at a temperature of 250° C.

The silicon-oxygen composite negative electrode material prepared in this example includes $SiO_{0.8}$, $Li_2Si_2O_5$, and a non-$Li_2Si_2O_5$ lithium-containing compound, wherein the $Li_2Si_2O_5$ covers the surface of the non-$Li_2Si_2O_5$ lithium-containing compound. The non-$Li_2Si_2O_5$ lithium-containing compound consists of lithium silicate ($Li_2SiO_3$) and lithium hydroxide. The $SiO_{0.8}$ is located inside the non-$Li_2Si_2O_5$ lithium-containing compound, and the content by mass percent of the oxygen element gradually decreases from the surface of $SiO_{0.8}$ to the interior of $SiO_{0.8}$. The thickness of $Li_2Si_2O_5$ is 120 nm. The molar ratio of $SiO_{0.8}$ to the non-$Li_2Si_2O_5$ lithium-containing compound is 1:4.3. The silicon-oxygen composite negative electrode material has a median particle size of 5.2 μm, and the silicon-oxygen composite negative electrode material has a pH value of 11. The silicon-oxygen composite negative electrode material further includes a carbon layer distributed on the surfaces of the particles, and the coating rate of the carbon layer is 80%.

Table 1 shows the results of performance testing of the silicon-oxygen composite negative electrode material prepared in this example.

Example 8

In this example, the operating conditions and the types and amounts of raw materials were the same as those in Example 2, except that the roasting in step (3) was performed at a temperature of 1030° C.

The silicon-oxygen composite negative electrode material prepared in this example includes $SiO_{0.8}$, $Li_2Si_2O_5$, and a non-$Li_2Si_2O_5$ lithium-containing compound, wherein the $Li_2Si_2O_5$ covers the surface of the non-$Li_2Si_2O_5$ lithium-containing compound. The non-$Li_2Si_2O_5$ lithium-containing compound consists of lithium silicate ($Li_2SiO_3$) and lithium hydroxide. The $SiO_{0.8}$ is located inside the non-$Li_2Si_2O_5$ lithium-containing compound, and the content by mass percent of the oxygen element gradually decreases from the surface of $SiO_{0.8}$ to the interior of $SiO_{0.8}$. The thickness of $Li_2Si_2O_5$ is 1000 nm. The molar ratio of $SiO_{0.8}$ to the non-$Li_2Si_2O_5$ lithium-containing compound is 1:3.8. The silicon-oxygen composite negative electrode material has a median particle size of 5.5 μm, and the silicon-oxygen composite negative electrode material has a pH value of 10.9. The silicon-oxygen composite negative electrode material further includes a carbon layer distributed on the surfaces of the particles, and the coating rate of the carbon layer is 80%.

Table 1 shows the results of performance testing of the silicon-oxygen composite negative electrode material prepared in this example.

Comparative Example 1

In this comparative example, the operating conditions and the types and amounts of raw materials were the same as those in Example 1, except that the operation of step (3) was not performed, and the operation of step (4) was performed by directly using the composite material obtained in step (2) as a raw material.

The negative electrode material prepared in this comparative example did not have a $Li_2Si_2O_5$ coating layer formed on the surface of the non-$Li_2Si_2O_5$ lithium-containing compound, and the pH value of the negative electrode material was 11.5.

Table 1 shows the results of performance testing of the silicon-oxygen composite negative electrode material prepared in this comparative example.

Testing Method

Structure characterization was performed by using the following method.

The particle size ranges of the silicon-oxygen composite negative electrode material products and the average particle size of the raw material particles were tested using a Malvern laser particle size tester MS 2000. The surface morphology and material structures of the silicon-oxygen composite negative electrode materials were observed using a scanning electron microscope S4800 (Hitachi).

The processability and electrochemical performance were tested by using the following methods.

Testing of Initial Performance: the silicon-oxygen composite negative electrode material obtained in a certain example or comparative example was used as an active material, and SBR+CMC (in a mass ratio of 1:1) were used as a binder, conductive carbon black was added, and then the mixture was stirred to make a slurry, which was applied to a copper foil, which was finally dried and rolled to make a negative electrode sheet, where the active material, the conductive agent, and the binder were present in a ratio of 85:15:10. A simulated battery was assembled in an argon-filled glove box by using a lithium metal sheet as a counter electrode, using PP as a separator, and using 1 mol/L $LiPF_6$/EC+DEC+DMC (the volume ratio of EC, DEC, and DMC was 1:1:1) as an electrolyte. A LAND 5V/10 mA battery tester was used to test the electrochemical performance of the button battery, which was charged at a voltage of 1.5 V and discharged to 0.01 V at a charge/discharge rate of 0.1 C.

Testing of Cycling Performance: the silicon-oxygen composite negative electrode material obtained in a certain example or comparative example was mixed uniformly with graphite at a mass ratio of 1:9 and used as an active material. A button battery was assembled in an argon-filled glove box by using a lithium metal sheet as a counter electrode, using PP as a separator, and using 1 mol/L $LiPF_6$/EC+DEC+DMC (the volume ratio of EC, DEC, and DMC was 1:1:1) as an electrolyte. A LAND 5V/10 mA battery tester was used to test the electrochemical performance of the battery at 50 cycles, which was charged at a voltage of 1.5 V and discharged to 0.01 V at a charge/discharge rate of 0.1 C.

Gas Generation Test for Slurry: the negative electrode material prepared in each of the examples and comparative example was used as an active material, SBR+CMC were used as a binder, and conductive carbon black was added. The active material, the conductive agent, and the binder were stirred at high speed and mixed evenly in a ratio of 95:2:3 to obtain a slurry, which was put into an aluminum-plastic film bag, sealed, and left to rest, and then a change in the shape of the aluminum-plastic film bag was monitored for a monitoring period of 1 month.

Application Test: each of the slurries prepared in the gas generation test was applied uniformly to a copper foil and dried, and then the presence or absence of pinholes, air pores or recesses in the surface of the electrode sheet was observed.

The results of the above processability and electrochemical performance tests are shown in Table 1.

TABLE 1

| Sample | Generation or Non-generation of Gas | Application | Initial Reversible Capacity | Initial Coulombic | Capacity Retention Ratio at |
|---|---|---|---|---|---|
| Example 1 | No gas was generated | Normal | 1408 | 88.5 | 89.6 |
| Example 2 | No gas was generated | Normal | 1420 | 90.5 | 89.8 |
| Example 3 | No gas was generated | Normal | 1405 | 89.5 | 90.0 |
| Example 4 | No gas was generated | Normal | 1401 | 88.1 | 89.7 |
| Example 5 | No gas was generated | Normal | 1398 | 86.6 | 90.0 |
| Example 6 | No gas was generated | Normal | 1422 | 89.6 | 90.3 |

TABLE 1-continued

| Sample | Generation or Non-generation of Gas | Application | Initial Reversible Capacity | Initial Coulombic | Capacity Retention Ratio at |
|---|---|---|---|---|---|
| Example 7 | A gas was generated | Pinholes | 1390 | 88.0 | 78.2 |
| Example 8 | No gas was generated | Normal | 1310 | 84.3 | 80.1 |
| Comparative | A gas was generated | Pinholes | 1100 | 67.4 | 77.0 |

It can be seen, from the foregoing Examples and Comparative Example, that in each of the silicon-oxygen composite negative electrode materials according to Examples 1 to 6, by coating the surface of a non-$Li_2Si_2O_5$ lithium-containing compound with dense and water-insoluble $Li_2Si_2O_5$ that does not negatively affect battery performance, generation of alkalinity due to contact of water with the internal non-$Li_2Si_2O_5$ lithium-containing compound is prevented effectively, so as to improve the processing stability of the pre-lithiated material. Moreover, the coated non-$Li_2Si_2O_5$ lithium-containing compound will not affect the water-based processability of the material and needs not to be removed additionally even if it is easily soluble in water or exhibits strong alkalinity. In this way, the maximum improvement of the initial efficiency of the material can be ensured, and a water-based slurry prepared therefrom can exhibit stable processability.

The silicon-oxygen composite negative electrode material according to Example 5 includes $SiO_{1.7}$, $Li_2Si_2O_5$, and a non-$Li_2Si_2O_5$ lithium-containing compound. Because the oxide of silicon in the negative electrode material has an excessively high oxygen content, more lithium needs to be consumed for forming a SEI film during the initial charge. Due to the increased consumption of lithium, the initial coulombic efficiency of the battery is significantly lower than those of Examples 1 to 4, and the initial coulombic efficiency is only 86.6%. It can thus be seen that the initial coulombic efficiency of the battery is advantageously improved when the oxide of silicon $SiO_x$ in the silicon-oxygen composite negative electrode material satisfies $0 \leq x \leq 1.2$.

In Example 7, the first silicon source $SiO_y$ and the reductive lithium source are roasted at a temperature of 250° C., and no outer layer of $Li_2Si_2O_5$ is generated due to the excessively low roasting temperature. In contrast, the first silicon source $SiO_y$ and the reductive lithium source in Example 2 are roasted at a temperature of 800° C. The negative electrode slurry prepared from the silicon-oxygen composite negative electrode material according to Example 7 produces a gas after resting for 3 days and is likely to have pinholes and exhibits poor processability when applied. The battery made of the negative electrode material in Example 2 is superior to that in Example 7 in terms of various properties including initial reversible capacity, initial efficiency, and cycle retention ratio. It can thus be seen that it is more appropriate to control the roasting temperature within a range of 300° C. to 1000° C. Preferably, the roasting temperature is controlled between 450° C. and 800° C., which can guarantee the processability and electrochemical performance of the product.

In Example 8, the first silicon source $SiO_y$ and the reductive lithium source are roasted at a temperature of 1030° C., and silicon crystal grains have grown and agglomerated due to the excessively high roasting temperature. In contrast, the first silicon source $SiO_y$ and the reductive lithium source in Example 2 are roasted at a temperature of 800° C. The battery made of the silicon-oxygen composite negative electrode material in Example 2 is superior to that in Example 8 in terms of various properties including initial reversible capacity, initial efficiency, and cycle retention ratio. It can thus be seen that it is more appropriate to control the roasting temperature within a range of 300° C. to 1000° C. Preferably, the roasting temperature is controlled between 450° C. and 800° C., which can avoid growth and agglomeration of silicon crystal grains, so as to improve the electrochemical performance of the material.

In Comparative Example 1, an operation of fusing the composite material containing a non-$Li_2Si_2O_5$ lithium-containing compound with a second silicon source and then performing a heat treatment is not carried out. In other words, no $Li_2Si_2O_5$ coating layer is formed on the surface of the non-$Li_2Si_2O_5$ lithium-containing compound, resulting in poor processability. The product of Comparative Example 1 is inferior to the product of Example 1 in terms of initial reversible capacity, initial coulombic efficiency, and retention ratio at 50 cycles.

The applicant declares that the detailed process apparatuses and process procedures of the present disclosure are described by the foregoing embodiments in the present disclosure, but the present disclosure is not limited to the foregoing detailed process apparatuses and process procedures. In other words, it is not intended that the implementation of the present disclosure must rely on the foregoing detailed process apparatuses and process procedures. It should be understood by those skilled in the art that any modifications of the present disclosure, equivalent replacement of each of raw materials of the products of the present disclosure, addition of auxiliary ingredients, and selection of specific methods or the like should fall within the scope as claimed and disclosed in the present disclosure.

What is claimed is:

1. A silicon-oxygen composite negative electrode material, comprising $SiO_x$, a non-$Li_2Si_2O_5$ lithium-containing compound and $Li_2Si_2O_5$, wherein the $Li_2Si_2O_5$ covers a surface of the non-$Li_2Si_2O_5$ lithium-containing compound, wherein $0 \leq x \leq 1.2$, and the silicon-oxygen composite negative electrode material has a pH value of $7 < pH < 11$, and the $Li_2Si_2O_5$ has a thickness of 100 nm to 5000 nm.

2. The silicon-oxygen composite negative electrode material according to claim 1, wherein the silicon-oxygen composite negative electrode material satisfies at least one of following definitions a to e:
   a. the non-$Li_2Si_2O_5$ lithium-containing compound comprises at least one of an oxide of lithium, a halide of lithium, a hydroxide of lithium, a lithium-containing alloy, a carbonate of lithium, a silicate of lithium and an acetate of lithium;
   b. a content by mass percent of an oxygen element in the $SiO_x$ gradually decreases from a surface of $SiO_x$ particles to an interior of the particles;
   c. the $SiO_x$ is located inside the non-$Li_2Si_2O_5$ lithium-containing compound;
   d. a mass ratio of the $SiO_x$ to the non-$Li_2Si_2O_5$ lithium-containing compound is 1:1.5 to 1:4.3; and
   e. the silicon-oxygen composite negative electrode material has an average particle size of 4 μm to 10 μm.

3. The silicon-oxygen composite negative electrode material according to claim 2, wherein the silicon-oxygen composite negative electrode material satisfies at least one of following definitions a to c:
   a. a carbon layer is further formed on a surface of the silicon-oxygen composite negative electrode material;
   b. a carbon layer is further formed on a surface of the silicon-oxygen composite negative electrode material, wherein the carbon layer has a thickness of 10 nm to 2000 nm; and
   c. a carbon layer is further formed on a surface of the silicon-oxygen composite negative electrode material, wherein the carbon layer has a coating rate of 60% to 100%.

4. The silicon-oxygen composite negative electrode material according to claim 1, wherein the silicon-oxygen composite negative electrode material satisfies at least one of following definitions a to c:
   a. a carbon layer is further formed on a surface of the silicon-oxygen composite negative electrode material;
   b. a carbon layer is further formed on a surface of the silicon-oxygen composite negative electrode material, wherein the carbon layer has a thickness of 10 nm to 2000 nm; and
   c. a carbon layer is further formed on a surface of the silicon-oxygen composite negative electrode material, wherein the carbon layer has a coating rate of 60% to 100%.

5. A lithium-ion battery, comprising a composite negative electrode material, wherein the composite negative electrode material comprises $SiO_x$, a non-$Li_2Si_2O_5$ lithium-containing compound and $Li_2Si_2O_5$, wherein the $Li_2Si_2O_5$ covers a surface of the non-$Li_2Si_2O_5$ lithium-containing compound, wherein $0 \leq x \leq 1.2$, wherein the silicon-oxygen composite negative electrode material has a pH value of $7 < pH < 11$, and the $Li_2Si_2O_5$ has a thickness of 100 nm to 5000 nm; or
   wherein the composite negative electrode material is prepared by a method for preparing a silicon-oxygen composite negative electrode material, comprising steps of:
   mixing a first silicon source $SiO_y$ with a reductive lithium source and roasting a mixture, so as to obtain a composite material, wherein the composite material comprises a non-$Li_2Si_2O_5$ lithium-containing compound, wherein $0 < y < 2$; and
   fusing the composite material with a second silicon source and then performing a heat treatment, so as to obtain the silicon-oxygen composite negative electrode material, wherein the silicon-oxygen composite negative electrode material comprises $SiO_x$, the non-$Li_2Si_2O_5$ lithium-containing compound and $Li_2Si_2O_5$, wherein the $Li_2Si_2O_5$ covers a surface of the non-$Li_2Si_2O_5$ lithium-containing compound, wherein $0 \leq x \leq 1.2$, wherein the silicon-oxygen composite negative electrode material has a pH value of $7 < pH < 11$, and the $Li_2Si_2O_5$ has a thickness of 100 nm to 5000 nm.

6. A method for preparing a silicon-oxygen composite negative electrode material, comprising steps of:
   mixing a first silicon source $SiO_y$ with a reductive lithium source and roasting a mixture, so as to obtain a composite material, wherein the composite material comprises a non-$Li_2Si_2O_5$ lithium-containing compound, wherein $0 < y < 2$; and
   fusing the composite material with a second silicon source and then performing a heat treatment, so as to obtain the silicon-oxygen composite negative electrode material, wherein the silicon-oxygen composite negative electrode material comprises $SiO_x$, the non-$Li_2Si_2O_5$ lithium-containing compound and $Li_2Si_2O_5$, wherein the $Li_2Si_2O_5$ covers a surface of the non-$Li_2Si_2O_5$ lithium-containing compound, wherein $0 \leq x \leq 1.2$, wherein the silicon-oxygen composite negative electrode material has a pH value of $7 < pH < 11$, and the $Li_2Si_2O_5$ has a thickness of 100 nm to 5000 nm.

7. The method according to claim 6, wherein the silicon-oxygen composite negative electrode material satisfies at least one of following definitions a to d:
   a. a content by mass percent of an oxygen element in the $SiO_x$ gradually decreases from a surface of $SiO_x$ particles to an interior of the particles;
   b. the $SiO_x$ is located inside the non-$Li_2Si_2O_5$ lithium-containing compound;
   c. a mass ratio of the $SiO_x$ to the non-$Li_2Si_2O_5$ lithium-containing compound is 1:1.5 to 1:4.3; and
   d. the silicon-oxygen composite negative electrode material has an average particle size of 4 μm to 10 μm.

8. The method according to claim 7, wherein the method satisfies at least one of following definitions a to e:
   a. the reductive lithium source comprises at least one of lithium hydride, lithium alkyl, lithium metal, lithium aluminum hydride, lithium amide, and lithium borohydride;
   b. the first silicon source is SiO;
   c. a mass ratio of the first silicon source to the reductive lithium source is 1:0.03 to 1:0.4;
   d. the first silicon source has a particle size D10 greater than 1.0 μm and Dmax less than 50 μm; and
   e. the non-$Li_2Si_2O_5$ lithium-containing compound comprises at least one of an oxide of lithium, a halide of lithium, a hydroxide of lithium, a lithium-containing alloy, a carbonate of lithium, a silicate of lithium and an acetate of lithium.

9. The method according to claim 7, further comprising: cooling and sieving the composite material obtained by the roasting so that the composite material has an average particle size of 2 μm to 9 μm.

10. The method according to claim 7, wherein the method satisfies at least one of following definitions a to c:
    a. the second silicon source comprises silicon dioxide;
    b. the second silicon source comprises nanoscale silicon dioxide; and
    c. a mass ratio of the composite material to the second silicon source is 1:0.1 to 1:3.

11. The method according to claim 6, wherein the method satisfies at least one of following definitions a to e:
    a. the reductive lithium source comprises at least one of lithium hydride, lithium alkyl, lithium metal, lithium aluminum hydride, lithium amide, and lithium borohydride;
    b. the first silicon source is SiO;
    c. a mass ratio of the first silicon source to the reductive lithium source is 1:0.03 to 1:0.4;
    d. the first silicon source has a particle size D10 greater than 1.0 μm and Dmax less than 50 μm; and
    e. the non-$Li_2Si_2O_5$ lithium-containing compound comprises at least one of an oxide of lithium, a halide of lithium, a hydroxide of lithium, a lithium-containing alloy, a carbonate of lithium, a silicate of lithium and an acetate of lithium.

12. The method according to claim 11, wherein the method satisfies at least one of following definitions a to c:
    a. the roasting is performed in a non-oxidizing atmosphere, wherein the non-oxidizing atmosphere comprises at least one of hydrogen, nitrogen, helium, neon, argon, krypton, and xenon;
- b. the roasting is performed at a temperature of 300° C. to 1000° C.; and
- c. the roasting is performed for a duration of 1 h to 8 h.

13. The method according to claim 6, further comprising:
cooling and sieving the composite material obtained by the roasting so that the composite material has an average particle size of 2 μm to 9 μm.

14. The method according to claim 6, wherein the method satisfies at least one of following definitions a to c:
- a. the second silicon source comprises silicon dioxide;
- b. the second silicon source comprises nanoscale silicon dioxide; and
- c. a mass ratio of the composite material to the second silicon source is 1:0.1 to 1:3.

15. The method according to claim 14, wherein the method satisfies at least one of following definitions a to c:
- a. the heat treatment is performed at a temperature of 300° C. to 600° C.;
- b. the heat treatment is performed at a heating rate less than 2° C./min; and
- c. the heat treatment is performed for a duration of 0.5 h to 4 h.

16. The method according to claim 6, further comprising, before the mixing a first silicon source $SiO_y$ with a reductive lithium source,
heating and gasifying raw materials of an oxide of silicon in a protective atmosphere or in vacuum, so as to produce a gas of the oxide of silicon, and cooling and shaping a resultant to obtain particles of the first silicon source $SiO_y$, wherein $0<y<2$.

17. The method according to claim 16, wherein the method satisfies at least one of following definitions a to d:
- a. the raw materials of the oxide of silicon comprise Si and $SiO_2$;
- b. the heating is performed at a temperature of 900° C. to 1300° C.;
- c. the shaping comprises at least one of crushing, ball milling and classification; and
- d. the particles of the first silicon source $SiO_y$ have a D10 greater than 1.0 μm and a Dmax less than 50 μm.

18. The method according to claim 6, further comprising:
coating, using carbon, a material to be coated by carbon, wherein the material to be coated by carbon comprises at least one of the first silicon source and the silicon-oxygen composite negative electrode material.

19. The method according to claim 18, wherein the method satisfies at least one of following definitions a to c:
- a. the coating using carbon comprises at least one of gas-phase carbon coating and solid-phase carbon coating;
- b. the coating using carbon comprises at least one of gas-phase carbon coating and solid-phase carbon coating, wherein the gas-phase carbon coating is performed at a condition where the material to be coated by carbon is heated up to 600° C. to 1000° C. in a presence of a protective atmosphere, an organic carbon source gas is introduced, a temperature is maintained for 0.5 h to 10 h and then a resultant is cooled, wherein the organic carbon source gas comprises a hydrocarbon, and the hydrocarbon comprises at least one of methane, ethylene, acetylene, and benzene; and
- c. the coating using carbon comprises at least one of gas-phase carbon coating and solid-phase carbon coating, wherein the solid-phase carbon coating is performed at a condition where the material to be coated by carbon is fused with a carbon source for 0.5 h to 2 h and then an obtained carbon mixture is carbonized at 600° C. to 1000° C. for 2 h to 6 h and cooled, wherein the carbon source comprises at least one of polymers, saccharides, organic acids and asphalt.

20. The method according to claim 6, comprising steps of:
mixing SiO with a reductive lithium source in a mass ratio of 1:0.03 to 1:0.4, roasting a mixture in a presence of a non-oxidizing atmosphere at a roasting temperature of 450° C. to 800° C. for a roasting duration of 1 h to 8 h, and then cooling and sieving a resultant, so as to obtain a composite material, wherein the composite material comprises a non-$Li_2Si_2O_5$ lithium-containing compound; and
fusing the composite material with $SiO_2$ in a mass ratio of 1:0.1 to 1:3 and then performing a heat treatment at 300° C. to 600° C. for a heat treatment duration of 0.5 h to 4 h, so as to obtain the silicon-oxygen composite negative electrode material, wherein the heat treatment is performed at a heating rate less than 2° C./min,
wherein the method further comprises coating, using carbon, at least one of the SiO and the silicon-oxygen composite negative electrode material, wherein the coating with carbon comprises at least one of gas-phase carbon coating and solid-phase carbon coating.

* * * * *